(12) United States Patent
Chang et al.

(10) Patent No.: US 6,292,825 B1
(45) Date of Patent: Sep. 18, 2001

(54) SERVICE APPLICATION WITH PULL NOTIFICATION

(75) Inventors: David Yu Chang; Ajay Kumar Reddy Karkala; John Shih-Yuan Wang, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/190,557

(22) Filed: Nov. 12, 1998

(51) Int. Cl.[7] .................................................... G06F 13/00
(52) U.S. Cl. ............................................................ 709/206
(58) Field of Search ..................................... 709/203, 206

(56) References Cited

U.S. PATENT DOCUMENTS

| | | | |
|---|---|---|---|
| 5,561,637 | * 10/1996 | Dan et al. | 365/230.03 |
| 5,694,546 | 12/1997 | Reisman | 705/26 |
| 5,737,619 | 4/1998 | Judson | 707/500 |
| 5,893,091 | * 4/1999 | Hunt et al. | 707/3 |
| 6,138,158 | * 10/2000 | Boyle et al. | 709/225 |

* cited by examiner

*Primary Examiner*—Kenneth R. Coulter
(74) *Attorney, Agent, or Firm*—David A. Mims, Jr.; Robert V. Wilder (57) ABSTRACT

A method and implementing computer system is provided in which an event/notification channel of a service provider will send a brief "notification" of an arrival of a full or complete event/notification message which has been received in an event/notification channel, to all relevant pull consumers to inform the consumers that a more detailed message concerning an event being monitored has just arrived. The brief notification can be repeated for a predetermined number of times which is defined by the consumer. After sending a brief notification a predetermined number of times, the event/notification channel assumes that the pull consumer is not operational or no longer interested in the event and the event can then be discarded by the event/ notification channel. The brief notification sent to the pull consumers may identify any attachments and the consumer may elect to receive the full event notification message without any or with only selected ones of the attachments. The consumer may direct the service provider to delete the attachments when the full notification is retrieved by the consumer, or the service provider may be programmed to automatically delete any attachments after a certain amount of time following retrieval of the event message by a consumer.

11 Claims, 5 Drawing Sheets

SERVICE APPLICATION WITH PULL NOTIFICATION

RELATED APPLICATIONS

The present application is related to co-pending application entitled "MANAGING UNUSED RESOURCES IN A SERVICE APPLICATION", application Ser. No. 09/190,558, now allowed, filed on even date herewith, assigned to the assignee of the present application and included herein by reference.

FIELD OF THE INVENTION

The present invention relates generally to information processing systems and more particularly to a methodology and implementation for message processing over networked communication systems.

BACKGROUND OF THE INVENTION

The recent growth and acceptance of the Internet and the World Wide Web has focussed much attention to networked systems in general and to the potential for mass communication and information transfer. More and more groups of individuals can now satisfy a long felt need for rapid and wide area distribution of information including documents containing thousands and thousand of pages. Now, over networks, such massive amounts of information can be sent from one terminal or server to another terminal or server in a network almost instantaneously.

With the availability and ease of use of such a resource, more information is being transferred on a routine basis. Many times a message is sent via an electronic mail and documents are referenced in the message and are routinely attached and sent with the message. Frequently, the attachments are voluminous and often contain rich graphic detail. In many cases, the intended receiver or consumer of the information already has, or does not need, the attachment and the attachment is quickly deleted after receipt. For example, a stock movement report may be sent from a "supplier" to a "consumer" and the report may include a statement or notice of a watched-for stock-related event along with a "10K" report or company annual report. The consumer may already have the "10K" report and the annual report, in which case, the attachments will be deleted but only after they have been sent to the consumer. Thus massive amounts of bytes of information may be being transferred even with the simplest of messages. As the ease of information transfer increases, so does the need for, and the amount of, information being transferred. On a large scale, there is a tendency to overload communication channels with unnecessary information, which in turn, may slow down the entire network.

In so called "service applications", which run on system or network servers, "suppliers" of information send information to the server memory and such information is held in memory until a "consumer" of information at another terminal in the system, asks for or "pulls" the posted information from the service application to the consumer's terminal. In some service applications such as so called "Event/Notification" service applications, a "pull" consumer has to specifically apply the "pull" operation to the event/notification channel in order to get the event. For example, a stock market "watch" service application may be tasked to "notify" a consumer when a designated stock reaches a certain value or changes by a certain amount. A pull consumer will, however, not be aware of this event unless the pull consumer logs on to the application and specifically directs that all messages that may be at the server site and addressed to the consumer be delivered. Similar "event notification" applications exist for manufacturing operations where an assembly line terminal needs to be informed when a part is available, or for the insurance industry where an agent needs to be informed when the status of a customer has changed.

The "pull" procedure is also required in standard electronic mail systems where a consumer or user, after logging on to a server, must specifically ask to have any waiting mail to be sent to the consumers terminal. This is not done automatically and if the user logs on to the server and does not request to have his mail sent, the mail will not be sent and the consumer may not even be aware that he has mail. Once the consumer requests that the mail be sent, the electronic messages or mail, including any and all attachments, are sent to the consumer terminal. The user therefore cannot determine whether the attachments are needed until they have already been sent to the consumer's memory.

In most of the above examples, if for any reason, the pull consumer fails to pull the event from the service application, the events will be accumulated inside the event/notification channel and will be discarded after a period of time. The pull consumers need to be immediately informed that there are messages waiting to be pulled. Also, events with the same priority will be pulled in a first-in first-out order. The pull consumer has no option to pull a particular event out of the order in which the events are stored in the message queue.

Thus there is a need for an improved methodology and implementing system which enables a more efficient and more effective use of communication and information transfer systems, especially in event notification systems which include pull-type communication techniques.

SUMMARY OF THE INVENTION

A method and implementing computer system is provided in which an event/notification channel of a service provider will send a brief "notification" of an arrival of a full or complete event or message which has been received in a notification channel. In an exemplary embodiment, the event message arrival notification is sent to all relevant pull consumers, to inform the consumers that a more detailed message concerning an event being monitored has just arrived. The brief notification can be repeated for a predetermined number of times as may be defined by the consumer. After sending a brief notification a predetermined number of times, the event/notification channel assumes that the pull consumer is not operational or no longer interested in the event and the event message can then be discarded by the event/notification channel. The brief notification sent to the pull consumers may identify any attachments and the consumer may elect to receive the full event notification message without any, or with only selected ones, of the attachments. The consumer may direct the service provider to delete the attachments when the full notification is retrieved by the consumer, or the service provider may be programmed to automatically delete any attachments after a certain amount of time following retrieval of the event message by a consumer.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Various methods discussed herein may be implemented within a networked computer system which may include a large number of workstations, terminals and personal computers. In general, an implementing computer system may include a plurality of processors in a multi-bus system in a network of similar systems. However, since the workstations or computer systems implementing the present invention in an exemplary embodiment, are generally known in the art and composed of electronic components, circuits and related hardware which are also generally known to those skilled in the art, specific circuit details beyond those shown are not depicted to any greater extent than that considered necessary, as illustrated, for the understanding and appreciation of the underlying concepts of the present invention and in order not to obfuscate or distract from the teachings of the present invention.

Figure 1:
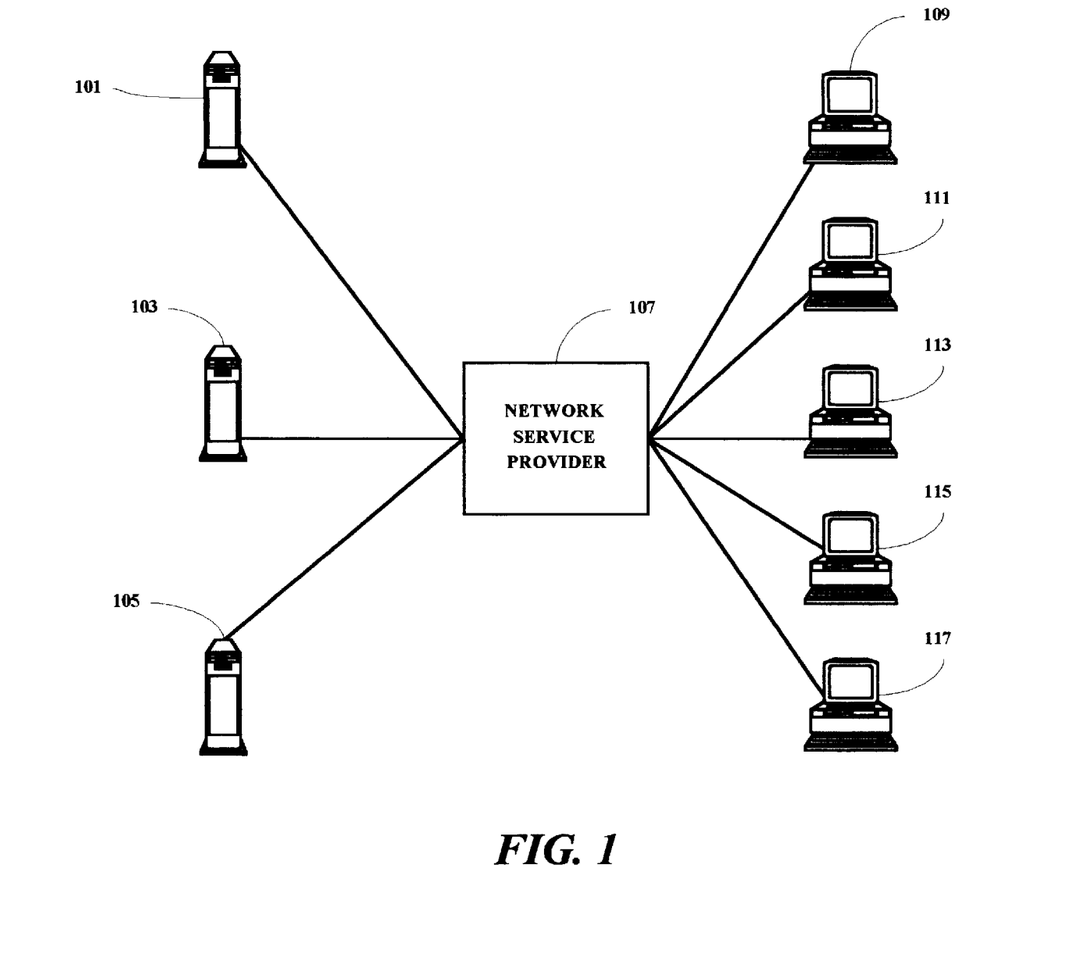
FIG. 1 is a diagram of a network system in which the present invention may be implemented.

With reference to FIG. 1, the various methods discussed herein may be implemented within an exemplary networked system including a number of web site servers such as servers 101, 103 and 105 which are coupled to a network service provider 107. The network service provider computer system 107 is arranged such that a number of individual terminals 109, 111, 113, 115 and 117 may be coupled thereto. In the present example, the individual terminals may be PCs (personal computers), workstations or other terminal devices designed to work in the networked system illustrated. Moreover, the networked system illustrated may be the Internet or a hard wired or wireless private network system wherein any connected terminal is equipped to communicate with the network service provider as well as through the network service provider to any other terminal in the network.

Figure 2:
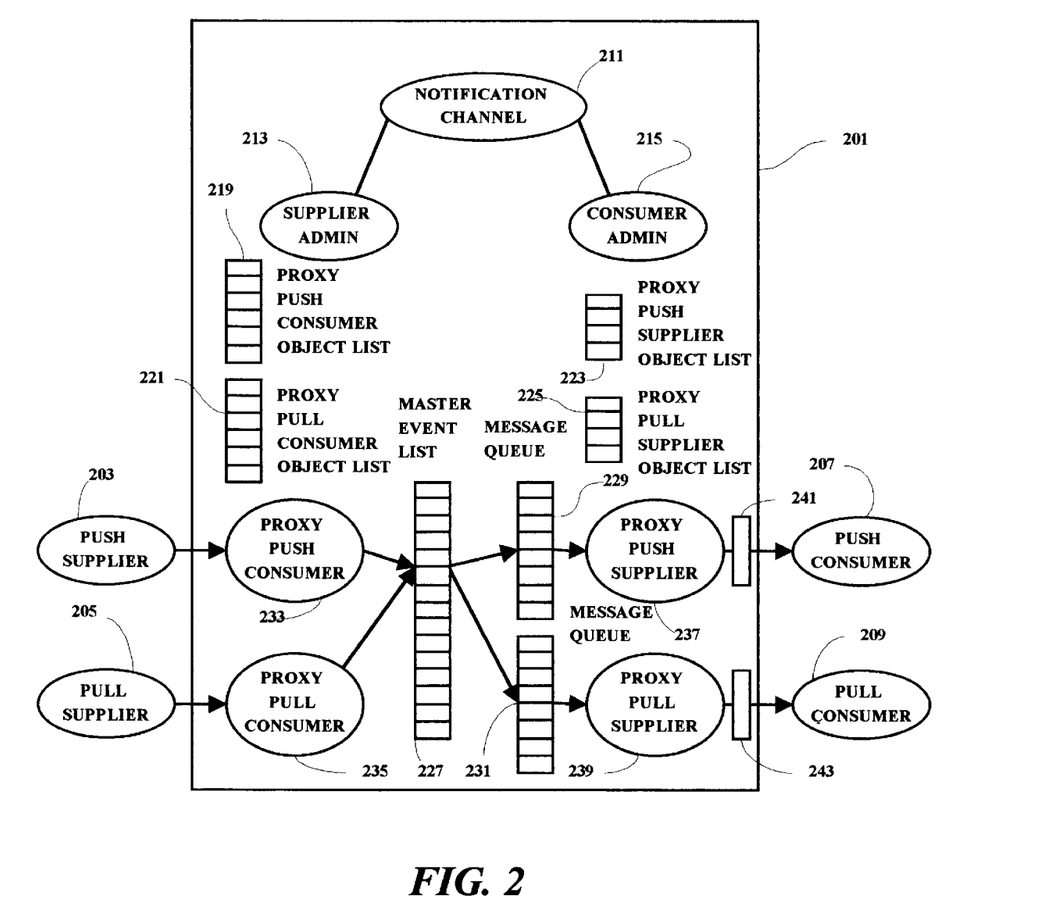
FIG. 2 is a logical representation of the notification channel implemented in accordance with the present invention.

Generally, the present disclosure refers to senders of information as "suppliers" and receivers of information as "consumers". Both the terminals and the web sites or servers can be both suppliers and consumers of information. Individual terminals may send messages or "events" to other individual terminals through the service provider and web site servers may also send and receive or communicate messages or events with individual terminals. Further, a "push" supplier refers to a communication that is "pushed" directly through to an intended "push" receiver terminal. Similarly, a "pull" supplier is arranged to communicate with "pull" consumers by sending messages to a network server where such messages are held until they are "pulled" from the server at the direction the "pull" consumer. In other words, in a "pull" system, messages or events are not delivered to a consumer unless the pull consumer logs in and specifically requests that stored events be sent to the pull consumers terminal. FIG. 2 illustrates several of the functional aspects of a network server unit 201 which includes the program framework of the present example. As illustrated, a network server 201 is arranged to include a number of objects. Among such objects, are a number of push suppliers, such as push supplier 203, and a number of pull suppliers, such as pull supplier 205. Also included are push consumers, such as push consumer 207, and pull consumers, such as pull consumer 209. The server 201 includes a notification channel 211 which in turn includes several software resources. The notification channel resources include a supplier administrator facility or "supplier admin" 213, and a consumer administrator facility or "consumer admin" 215. The notification channel 211 manages the supplier administrator 213, the consumer administrator 215 and also a master event list 227.

As push suppliers and pull suppliers send information to the server 201 for transmission to consumer terminals, the notification channel 211 sets-up proxy push consumers 233 and proxy pull consumers 235 to negotiate with push supplier 203 and pull supplier 205, respectively, for example. The consumer proxy units 233 and 235 input to a master event list 227, which, in turn, outputs to related message queues 229 and 231 for proxy push supplier 237 and proxy pull supplier 239. The supplier administrator facility 213 manages a proxy push consumer object list 219 in memory, and also a proxy pull consumer object list 221 in memory. The consumer administrator facility 215 manages memory segments containing a proxy push supplier object list 223 and a proxy pull supplier object list 225. The supplier proxy units 237 and 239 provide outputs through respective filters 241 and 243 to push consumer 207 and pull consumer 209. The filters 241 and 243 are arranged such that consumers can filter the messages they wish to receive from the server 201. For example, messages may be tagged on a three tier priority basis, and the consumer may choose to have only the highest priority messages delivered at a particular time or for a particular time period. Messages may also be filtered by age such that older messages are discarded after a predetermined period of time or that older messages are displayed first, or not at all. Messages may also be tagged on a priority basis and the consumer may choose to see only messages of a certain priority.

Typically, in a pull consumer operation, messages which have been sent to a pull consumer, are stored at a server, and the pull consumer does not receive the messages until the pull consumer logs on to the server and specifically keys-in or "points to" an icon indicating a specific request that stored messages be delivered. In accordance with the present invention, brief and concise "notifications" are sent from the server to the consumer terminal automatically when the pull consumer is on-line and messages are waiting at the server. Such notifications are designed to contain significant but minimal information concerning the messages destined for the consumer. For example, the notifications may contain a "priority" field, a "date created" field, a date by which action is required, and even a listing of attachments to the queued consumer messages. The consumer is able to view the notifications of the stored messages immediately upon logging on to the server. At that time, the consumer may select which messages of the notified listed messages to receive and view. The consumer may also select other preferences. For example, upon observing in a message notification that the designated message has an unusually long document attached to the message, the consumer may elect to deliver only the message without the attached document. In that event, only the body of the message will be sent from the server to the consumer terminal and the document attached to the message will not be sent to the consumer in accordance with the request of the consumer. The attachment may be designated by the consumer to be destroyed or held by the server for a predetermined amount of time before being destroyed. Thus, the notification process minimizes the data transfer and enables the consumer to be aware of waiting messages, and manage messages which the consumer desires to actually receive at the consumer terminal through the use of the notification methodology described herein.

Figure 3:
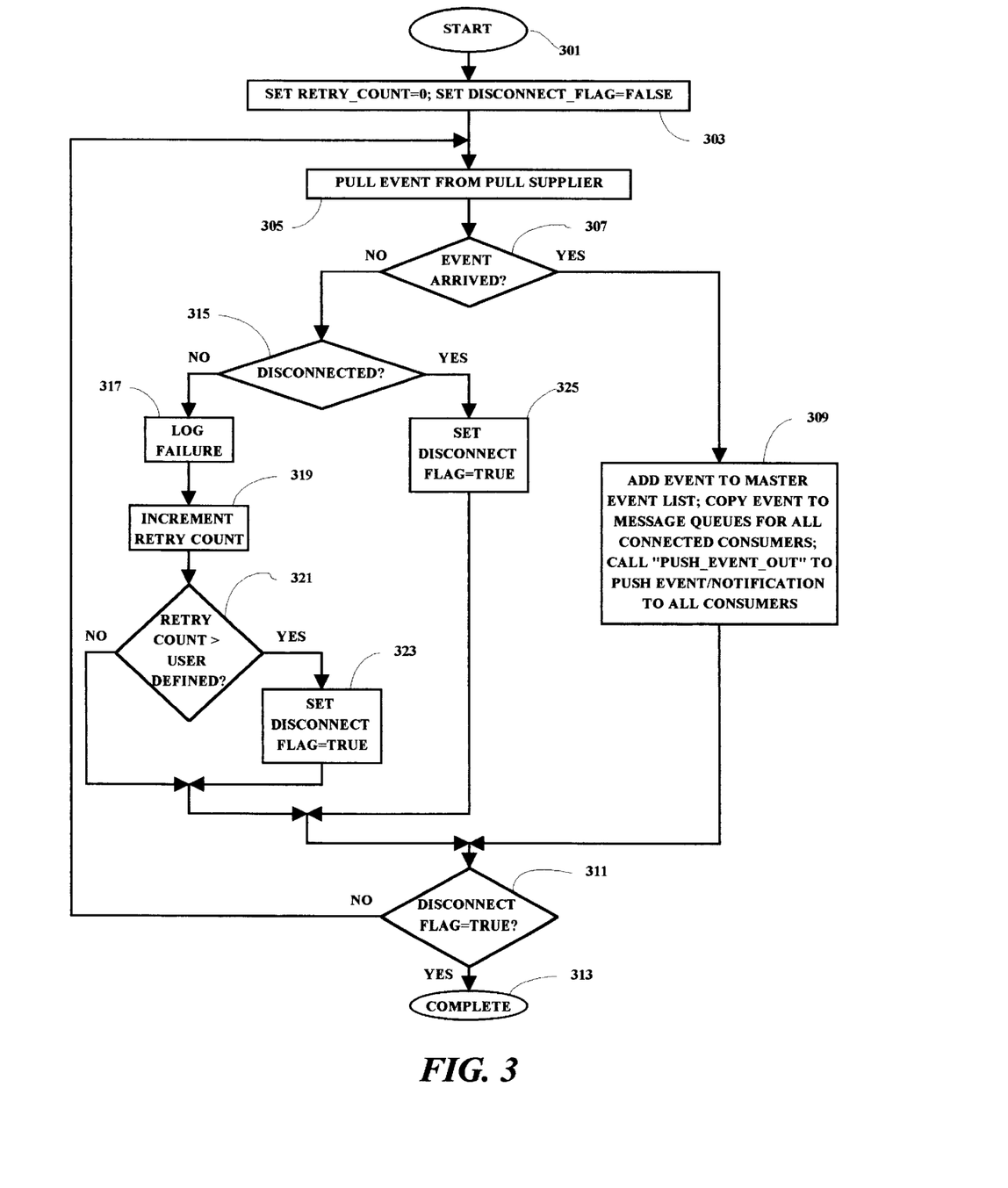
FIG. 3 is a flow chart of a "pull event in" operational sequence accomplished in accordance with the exemplary embodiment.
Figure 4:
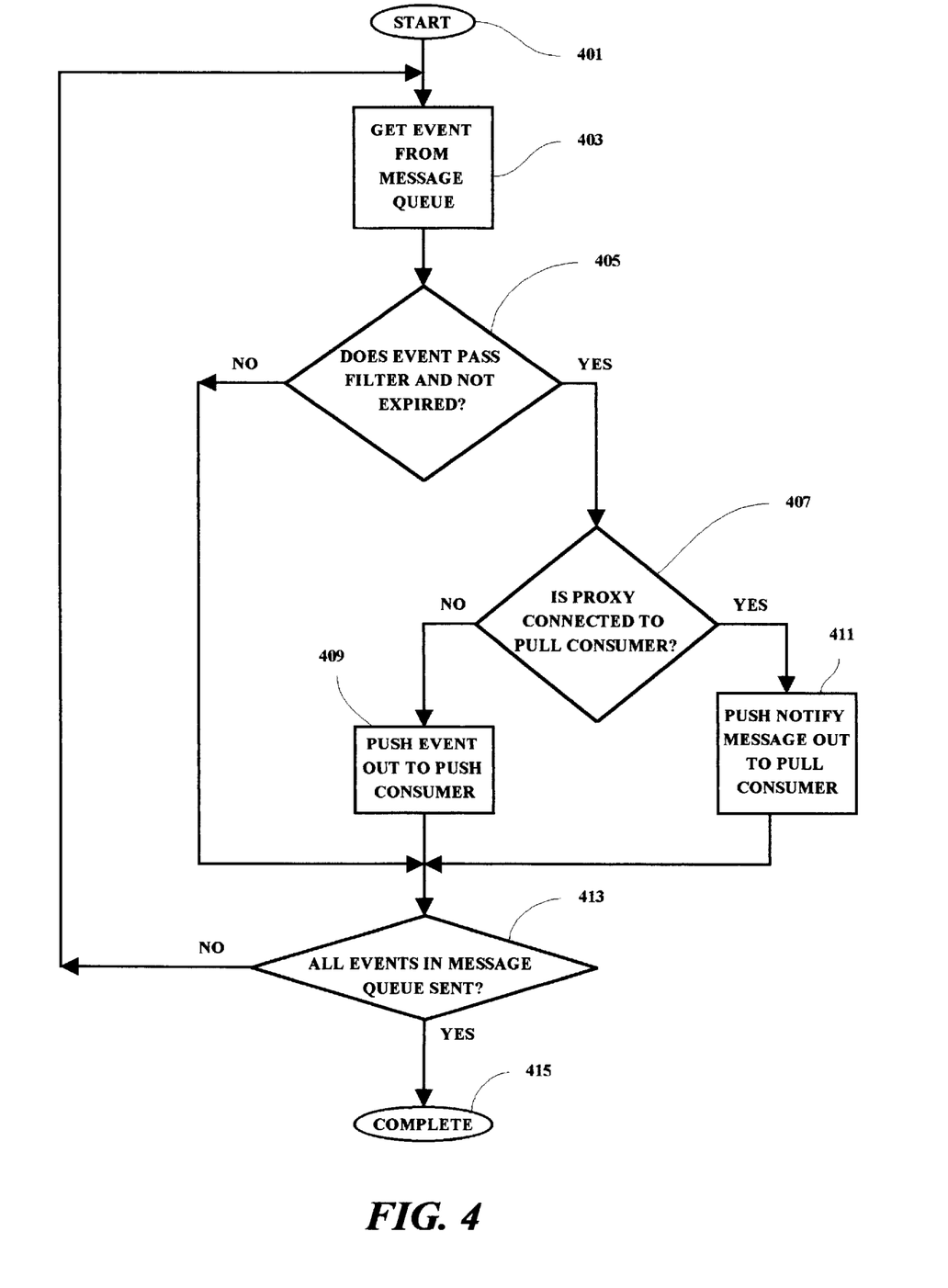
FIG. 4 is a flow chart illustrating a "push event out" operational sequence accomplished in accordance with the exemplary embodiment.
Figure 5:
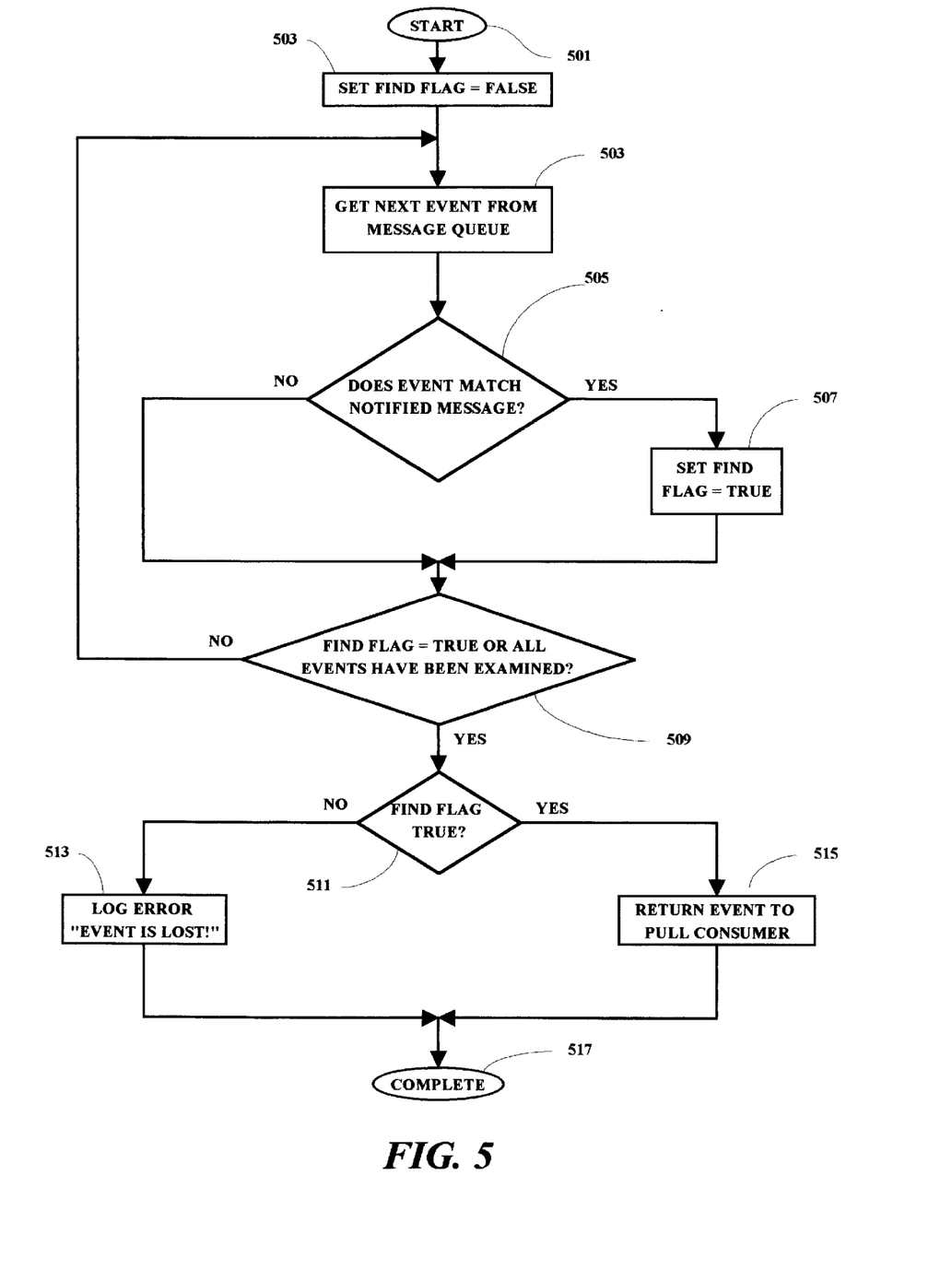
FIG. 5 is a flow chart illustrating a "pull event out" operational sequence accomplished in accordance with the exemplary embodiment

Certain operational sequences of the exemplary methodology are disclosed in FIGS. 3, 4 and 5. In effect, the disclosed methodology notifies pull consumers that messages concerning monitored events have arrived at a server site. A brief "notification" of the arrival of the message includes certain selected aspects of the message, such as priority and time of arrival, for example. The notification process in effect requires the "pull" consumer to implement a "push" method relative to the advance notification of the arrival of the complete event message. In the exemplary embodiment, the term "Event Channel" as used herein means the Notification Channel which handles Notification Events. As hereinbefore noted, the event notifications sent to the consumer can also be filtered so that only consumer designated event notifications are sent via a "push" process to the consumer terminal. The terms "Notified Message", or "notification" is the message sent to notify the pull consumer that a real "Event" is available to be pulled. The term "event" refers to a monitored occurrence and is typically sent from the Event supplier.

The following pseudocode listing describes a methodology for pulling events in from a pull supplier into the event channel. These events will be delivered to all of the push consumers and all of the pull consumers.

"Pull_Events_In—Pulling Events from the Pull Supplier into the Event Channel":
 Set retry_count to 0;
 Set disconnect flag to FALSE;
 REPEAT
  Pull an event from the Pull Supplier;
  IF (event arrived)
   Add Event into the Master Event List;
   Copy Event into the Message Queue for all the connected consumers;
   CALL (Push_Event_Out) to push Event to all the Consumers;
  ELSE
   IF (the Pull Supplier is disconnected from the Event Channel) Set disconnect flag to TRUE;
  ELSE
   Log failure: "Unable to pull from supplier partner!";
   Increment retry_count by 1;
   IF (retry_count>User defined Number of Retry)
    Set disconnect flag to TRUE;
   ENDIF;
  ENDIF:
 UNTIL (disconnect flag is set to TRUE);

The above pseudocode is illustrated in flow chart form in FIG. 3. As the process starts 301, a retry count is set to zero and a disconnect flag is set to false 303. Next, an event is pulled from an event supplier 305 and a check is made to determine if the event has arrived 307. If the event has arrived, the event is added to the master event list 227; the event is copied to the message queues (such as 229 and 231) for all connected consumers; "push_event_out" is called to push the event or notification message to all consumers 309. Thereafter, if the disconnect flag is true 311, the process is completed 313. If the event arrival check 307 determines that an event has not yet arrived, a check is made 315 to determine if the pull supplier is disconnected from the event channel. If so, the disconnect flag is set to a "true" setting and the process completes 313. If the event supplier is connected but there is still a failure for any reason, then the failure is logged 317 to a memory, and a retry count is incremented 319. After a predetermined number of retries 321, the disconnect flag is set true and the process completes 313. Until the predetermined number of retries has been exceeded 321, the process will re-cycle and again try to pull an event from a pull supplier 305.

The following pseudocode listing describes a methodology for pushing events from a message queue to all consumers. For any push consumer, the real event will be delivered. For any pull consumer, only the notice or "Notified Message" will be sent and the real event message will remain in the message queue waiting to be pulled by the pull consumer or discarded.

"Push_Event_Out":
 REPEAT
  Get the next Event from the Message Queue;
  IF (Event matched the filter AND Event is not expired)
   IF (Proxy is connected to the Pull Consumer)
    Remain real Event in the message Queue and Push Notified Message to the Consumer;
   ELSE
    Push real Event to the Consumer;
   ENDIF;
  ENDIF;
 UNTIL (all the events in the Message Queue has been sent out);

The above pseudocode is illustrated in flow chart form in FIG. 4. As the process starts 401, an event is retrieved 403 from the message queue. If the event passes the consumer designed filter and has not expired in accordance with a consumer designated preference 405, a determination is made as to whether a proxy is connected to a "pull" consumer 407. If a proxy is connected to a pull consumer 407, then the notify message is pushed out 411 to the pull consumer. If the proxy is connected to a push consumer, the entire event message (not merely the notify message) is "pushed" out 409 to the push consumer. If an event does not pass a consumer filter (for example if the message is lower than a consumer identified priority or is not related to a specified subject), or the event has expired 405, then the process skips to step 413 to determine if all of the events in the message queue have been sent 413. When all of the messages have been sent, the process completes 415.

The following pseudocode listing describes a methodology for a "Pull_Event_Out" operation, i.e. pulling real events from the Event Channel into the pull consumer. In a normal event pulling model, events with the same priority can only be pulled in a first-in first-out order. The user has no other option with regard to which event the user can pull first. If the user decides to pull a specific event, the user should not have to wait for all the events with a higher priority to be received before the user can receive the specific event chosen. After the pull consumer decides to pull the real event after having first examined the notice or "Notified Message", the particular event is located in the message queue, and then delivered immediately to the pull consumer, bypassing higher priority events.

```
Pull_Event_Out:
Set find flag to FALSE;
REPEAT
   Get next Event from Message Queue;
   IF (Event matches the Notified Message)
      Set find flag to TRUE;
   ENDIF;
UNTIL (find flag=TRUE or all Events have been examined);
IF (find flag=TRUE)
   Return Event to Pull Consumer;
ELSE
   Log Error "Event is lost!";
ENDIF;
```

The above pseudocode is illustrated in flow chart form in FIG. 5. When the process starts 501, the "find" flag is set to FALSE 503. The next event is then retrieved 503 from the message queue and a check is made to determine if the Event retrieved matches the Notified Message 505 selected by the pull consumer. If there is a match, then the "find" flag is set to TRUE 507 and the process continues. If there is no match, the process goes directly to the next step without changing the "find" flag. In the next step, a check is made to determine if either the "find" flag is true or if all of the events have been examined 509. If neither case is true, the process returns to get the next event from the message queue 503. If either or both cases are true, the process continues by determining if the "find" flag is set to TRUE. If the "find" flag is set to TRUE, it means that the event located is the event referred to in the Notified Message, and that event is returned to the pull consumer 515. If the "find" flag is not TRUE, then the referred to event does not match the Notified Message and all events have been examined. In that case, the event is logged as "lost" 513 and the process completes 517.

It is understood that the above pseudocode listings are some of many possible listings which could be used to implement the methodology of the present invention. The method and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely in program code stored on a disk or diskette (portable or fixed), or other memory device, from which it may be executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for use in a communication system wherein event messages are sent from a supplier to a consumer of information, said method comprising:
   sending an event message from said supplier;
   storing said event message at a storage location remote from said consumer until said consumer requests delivery of said event message;
   sending a notification message to said consumer prior to said delivery request by said consumer, said notification message including predetermined notice information, said predetermined notice information including descriptive information related to said event message;
   listing notification messages for viewing by said consumer at a consumer terminal;
   enabling a consumer selection to delete selected portions of said event message; and
   sending only non-deleted portions of said event message to said consumer terminal in response to said consumer selection.

2. The method as set forth in claim 1 wherein said notification messages are listed according to a predetermined priority schedule.

3. The method as set forth in claim 1 and further including:
   enabling said consumer to select from said listing of said notification messages to identify any of said corresponding event messages to be sent from said storage location to said consumer.

4. The method as set forth in claim 3 and further including:
   sending said identified event message corresponding to said selected notification message from said storage location to said consumer terminal in response to said selection by said consumer.

5. The method as set forth in claim 2 and further including:
   enabling said consumer to select from said listing of said notification messages to identify any of said corresponding event messages to be sent from said storage location to said consumer.

6. The method as set forth in claim 5 and further including:
   sending said identified event message corresponding to said selected notification message from said storage location to said consumer terminal in response to said selection by said consumer.

7. The method as set forth in claim 1 and further including:
   enabling a consumer select portions of said event message for delivery to said consumer; and
   sending only said selected portions of said event message to said consumer terminal in response to said consumer selection.

8. The method as set forth in claim 1 and further including:
   filtering said notification message such that only notification messages having predetermined selected characteristics are sent to said consumer.

9. A method for use in a communication system wherein event messages are sent from a supplier to a consumer of information, said method comprising:
   sending an event message from said supplier;
   storing said event message at a storage location remote from said consumer until said consumer requests delivery of said event message;
   sending a notification message to said consumer prior to said delivery request by said consumer, said notification message including predetermined notice information, said predetermined notice information including descriptive information related to said event message;
   enabling a consumer selection to delete selected portions of said event message;

sending only non-deleted portions of said event message to said consumer terminal in response to said consumer selection; and deleting said event messages from said storage location after a predetermined period of time following said storing.

10. A storage medium including machine readable coded indicia, said storage medium being selectively coupled to a reading device, said reading device being selectively coupled to processing circuitry within a computer system, said reading device being selectively operable to read said machine readable coded indicia and provide program signals representative thereof, said program signals being effective to send event messages from a supplier to a consumer of information, said program signals being selectively operable to accomplish the steps of:

sending an event message from said supplier;

storing said event message at a storage location remote from said consumer until said consumer requests delivery of said event message;

sending a notification message to said consumer prior to said delivery request by said consumer, said notification message including predetermined notice information, said predetermined notice information including descriptive information related to said event message;

listing notification messages for viewing by said consumer at a consumer terminal;

enabling a consumer selection to delete selected portions of said event message; and sending only non-deleted portions of said event message to said consumer terminal in response to said consumer selection.

11. A communication system for use in sending event messages from a supplier to a consumer of information, said system comprising:

at least one supplier terminal;

a storage device; and a consumer terminal, said supplier terminal and said storage device being located remotely from said consumer terminal, said supplier terminal being selectively operable for sending an event message addressed to said consumer terminal;

means for storing said event message in said storage device until said consumer requests delivery of said event message;

means for sending a notification message to said consumer terminal prior to said delivery request by said consumer, said notification message including predetermined notice information, said predetermined notice information including descriptive information related to said event message;

means for listing notification messages for viewing by said consumer at a consumer terminal;

enabling a consumer selection to delete selected portions of said event message; and sending only non-deleted portions of said event message to said consumer terminal in response to said consumer selection.

* * * * *